United States Patent
Lai et al.

(10) Patent No.: US 7,557,310 B2
(45) Date of Patent: Jul. 7, 2009

(54) SYSTEM AND METHOD FOR ESTIMATING DYNAMIC QUANTITIES

(75) Inventors: Yu-Sheng Lai, Tainan (TW); Je-Wei Liang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 280 days.

(21) Appl. No.: 11/456,864

(22) Filed: Jul. 12, 2006

(65) Prior Publication Data

US 2007/0122035 A1    May 31, 2007

(30) Foreign Application Priority Data

Nov. 25, 2005   (TW) .............................. 94141428 A

(51) Int. Cl.
  *G01G 15/00* (2006.01)
  *G01G 19/00* (2006.01)
(52) U.S. Cl. .................... 177/25.13; 177/25.19; 705/28; 705/29
(58) Field of Classification Search .................. 705/28, 705/29; 177/25.13, 25.19
  See application file for complete search history.

(56) References Cited

U.S. PATENT DOCUMENTS

| | | | | |
|---|---|---|---|---|
| 4,419,734 A * | 12/1983 | Wolfson et al. | ............. | 702/129 |
| 4,891,755 A * | 1/1990 | Asher | ........................... | 705/28 |
| 4,961,533 A * | 10/1990 | Teller et al. | ............... | 177/25.19 |
| 5,031,642 A * | 7/1991 | Nosek | ........................ | 600/584 |
| 5,083,638 A * | 1/1992 | Schneider | ..................... | 186/61 |
| 5,125,465 A * | 6/1992 | Schneider | ..................... | 177/50 |
| 5,650,596 A * | 7/1997 | Morris et al. | ............ | 177/25.13 |
| 5,774,865 A * | 6/1998 | Glynn | ............................ | 705/2 |
| 6,639,156 B2 * | 10/2003 | Luke et al. | ............... | 177/25.13 |
| 6,758,397 B2 | 7/2004 | Catan | | |
| 2001/0007982 A1* | 7/2001 | Brown | ........................ | 705/28 |

\* cited by examiner

*Primary Examiner*—Randy W Gibson
(74) *Attorney, Agent, or Firm*—Jianq Chyun IP Office

(57) ABSTRACT

A system and method for estimating dynamic quantities is provided. The system includes an electronic identification recognition apparatus, a weight measuring apparatus, and a computing apparatus. The electronic identification recognition apparatus can recognize an electronic identification for a corresponding item placed into the system, and the weight measuring apparatus measures a total weight of all items that it carries. The computing apparatus is coupled to the weight measuring apparatus and the electronic identification recognition apparatus, for receiving the total weight, such that the quantity of the item can be estimated and recorded by using the total weights obtained respectively before and after the item is stored or removed and a recognition result from the electronic identification recognition apparatus.

15 Claims, 2 Drawing Sheets

SYSTEM AND METHOD FOR ESTIMATING DYNAMIC QUANTITIES

CROSS-REFERENCE TO RELATED APPLICATION

This application claims the priority benefit of Taiwan application serial no. 94141428, filed on Nov. 25, 2005. All disclosure of the Taiwan application is incorporated herein by reference.

BACKGROUND OF THE INVENTION

1. Field of the Invention

The present invention relates to a system and method for estimating quantities, and particularly relates to a system and method for estimating dynamic quantities.

2. Description of Related Art

For acquiring the quantity of a variety of items to determine whether to purchase, a fast and convenient review system is quite helpful in saving time and labor. At present, an ordinary review system can automatically count of the denumerable collection of items, such as desks, TVs, and pens. However, quantities of items such as meat, fruit, vegetables, and fluids cannot be calculated as they are measured by weight or volume.

Moreover, it might be possible to calculate the quantities of the items by using an apparatus, such as a platform scale, a water gauge, or a pressure gauge, but for the present inventory control system, only the quantity of single sort can be calculated by using the above apparatus, and it is impossible to measure other items at the same time.

SUMMARY OF THE INVENTION

In view of the above, the present invention provides a system for estimating dynamic quantities. The system can be used to measure a variety of items at the same time and adopt an electronic identification for recognition.

The present invention further provides a method for estimating dynamic quantities, which is suitable for estimating the quantities of items that cannot be counted with integer numbers.

According to an embodiment, the present invention provides a system for estimating dynamic quantities comprising an electronic identification recognition apparatus, a weight measuring apparatus and a computing apparatus. The electronic identification recognition apparatus can recognize an electronic identification for a corresponding item placed into the system, and the weight measuring apparatus measures a total weight of all items that it carries. The computing apparatus is coupled to the weight measuring apparatus and the electronic identification recognition apparatus, such that the weight of the item can be estimated and recorded by using the total weights obtained respectively before and after the item is stored, and a recognition result from the electronic identification recognition apparatus.

The present invention further provides a method for estimating dynamic quantities, suitable for determining the quantities of items stored in the system. The method for estimating dynamic quantities includes detecting and listing all the items stored in the system at first, wherein the items without electronic identifications that can be recognized are sorted into a specific category, namely "unknown items" as an example; detecting whether the total weight changes, and detecting whether the electronic identifications in the system are increased or reduced in response to the total weight changes. When the electronic identifications are increased, the corresponding items of the newly added electronic identifications are determined to be new items added to the system, and accordingly, an item list for the previously listed items is updated and the weight of the individual newly added items are estimated. On the other hand, when the electronic identifications are reduced, the corresponding items of the reduced electronic identifications are determined to be items removed from the system, and accordingly, the removed items are removed from the item list. When there is no change in the number of the electronic identifications, the weight of the aforementioned specific category, such as an "unknown items" category, is changed.

In one embodiment of the present invention, the information about tare weight and initial net weight are recorded in the above electronic identification. If k items are placed into the system at the same time, the individual weight value of k items are estimated according to the following expression:

$$\max\left(0, T - \sum_{j=1}^{k} P_j - \sum_{j=1, j \neq i}^{k} N_j\right) \leq R_i \leq \min\left(N_i, T - \sum_{j=1}^{k} P_j\right)$$

where, $R_i$ is an estimated weight of the $i_{th}$ item; $P_j$ is the tare weight of the $j_{th}$ item; $N_i$ and $N_j$ are the initial net weights of the $i_{th}$ item and the $j_{th}$ item respectively; T is the difference of the total weights obtained before and after the k items are placed into the system, i.e. the total weight of the k items.

According to the above embodiment, when m ($m \leq k$) items from the k items are removed from the system at the same time, for the purpose of simplicity without losing generality, assuming that the serial numbers of the m items are from 1st to mth, the individual weight range of the remaining k−m items from the k items is estimated according to the following expression:

$$\max\left(0, T - T' - \sum_{j=m+1}^{k} P_j - \sum_{j=m+1, j \neq i}^{k} N_j\right) \leq R_i \leq \min\left(N_i, T - T' - \sum_{j=m+1}^{k} P_j\right),$$

where $R_i$ is an estimated weight of the $i_{th}$ item; $P_j$ is the tare weight of the $j_{th}$ item; $N_i$ and $N_j$ are the initial net weights of the $i_{th}$ item and the $j_{th}$ item respectively; T is the difference of the total weights obtained before and after the k items are placed into the system, i.e. the total weight of the k items; and T' is the difference of the total weights obtained before and after the m items are removed from the system, i.e. the total weight of the m items.

To sum up, the present invention is suitable for accommodating a variety of items at the same time due to the electronic identification recognition employed. Moreover, depending on the method for estimating the quantity of items provided in the present invention, a quantity of one item, which is placed into the system at one time, can be precisely estimated. Also and, the quantities of variety of items, which are placed into the system at one time, can also be estimated.

In order to the make the aforementioned and other objects, features and advantages of the present invention comprehensible, a preferred embodiment accompanied with figures is described in detail as below.

DESCRIPTION OF EMBODIMENTS

Figure 1:
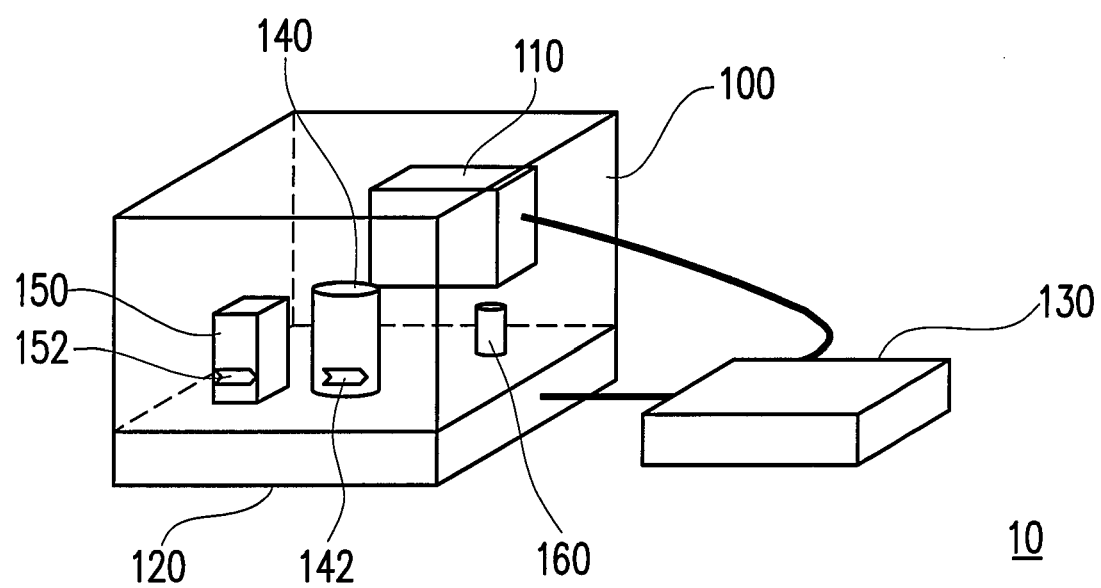
FIG. 1 is a block view of a system for estimating dynamic quantities according to an embodiment of the present invention.

FIG. 1 is a block view of a system for estimating dynamic quantities according to an embodiment of the present invention. Referring to FIG. 1, the system 10 for estimating dynamic quantities comprises an accommodation room 100, an electronic identification recognition apparatus 110 and a weight measuring apparatus 120, and a computing apparatus 130. The electronic identification recognition apparatus 110 and the weight measuring apparatus 120 are disposed in the accommodation room 100. Furthermore, preferably, the items 140 and 150 placed into the accommodation room 100 respectively have electronic identifications 142, 152 which can be recognized by the electronic identification recognition apparatus 110. Of course, if an item placed into the accommodation room 100, for example, item 160, does not have an electronic identification thereon or the electronic identifications on the item cannot be recognized, the item is sorted into a category namely "unknown items". In addition, the accommodation room 100 is not an essential item for implementing the present invention, and the accommodation room 100 can be a closed or an open room. In other words, according to the system of the present invention, only the weight measuring apparatus 120 is used for bearing the items, and the electronic identification recognition apparatus 110 is used for reading out the electronic identifications of the items that are placed on the weight measuring apparatus 120 and sending the related information to the computing apparatus 130.

In the embodiment, the weight measuring apparatus 120 includes the items stored in the accommodation room 100 and measures the total weight of the items. The computing apparatus 130 is coupled to the weight measuring apparatus 120 and the electronic identification recognition apparatus 110 for receiving the total weight such that the quantity of the item can be estimated and recorded by using the total weights obtained respectively before and after the item is stored and a recognition result about the electronic identification of the item in the accommodation room 100 from the electronic identification recognition apparatus 110.

It should be noted that although the weight measuring apparatus 120 herein is used to measure the weight of the items, it may be used in other applications, for example, a pressure measuring apparatus for measuring pressure. In this application, the weight of the item can be calculated by converting from the measured pressure value and related parameters. For simple illustration, the weight measuring apparatus is used to represent various measuring apparatus capable of obtaining accurate weight value in the following specification.

Figure 2:
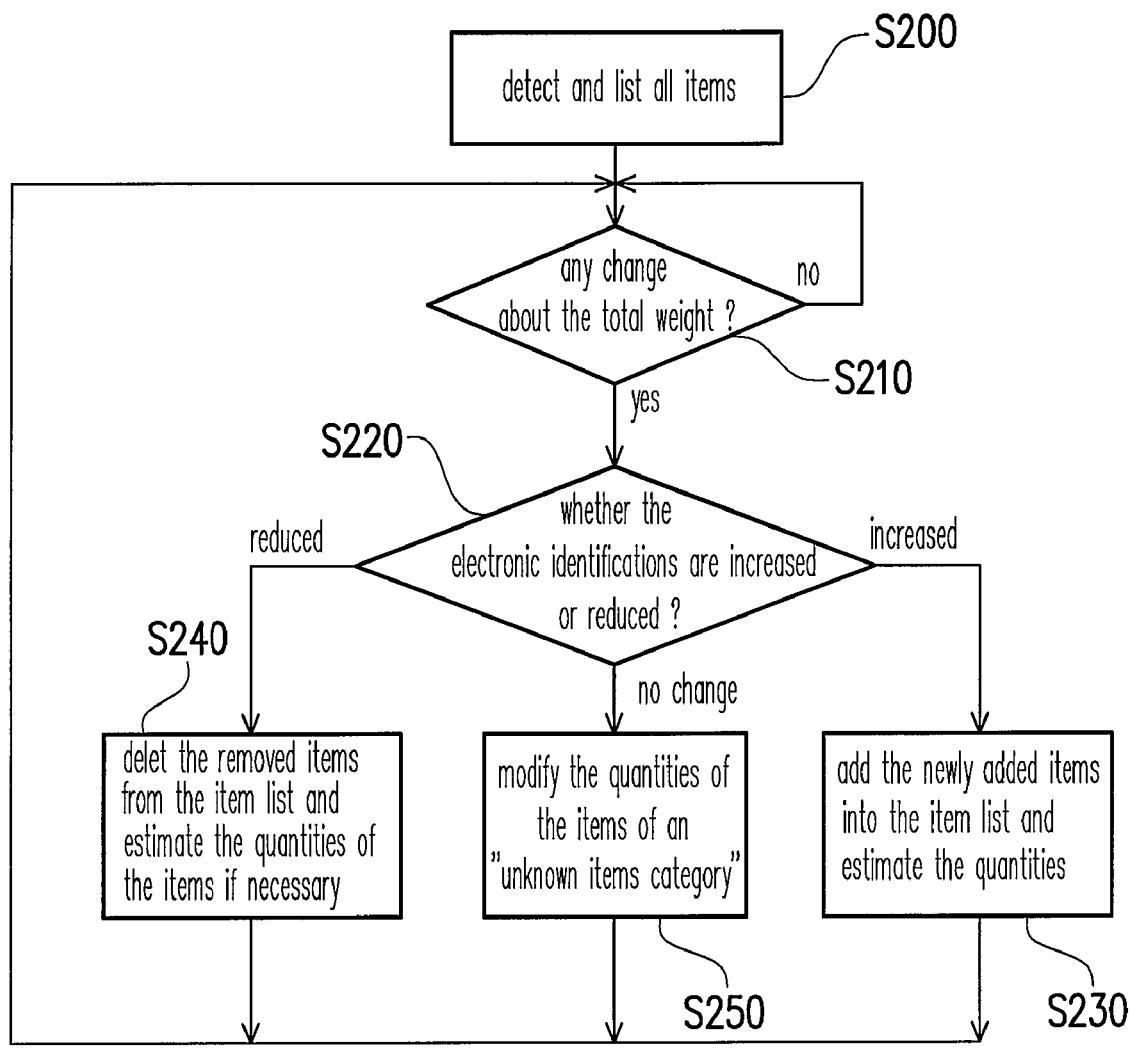
FIG. 2 is a flow chart of a method for estimating dynamic quantities according to an embodiment of the present invention.

In order to estimate the weight of each item accurately, a proper estimating method is absolutely necessary. Referring to FIG. 2, a flow chart of a method for estimating dynamic quantities according to one embodiment of the present invention. In the embodiment, if one or more items are located at certain position (the accommodation room 100 shown in FIG. 1), first, the categories and the total weight of the items at a certain position should be obtained before hand. In order to estimate dynamic quantities, various detecting apparatus (such as the electronic identification recognition apparatus of FIG. 1 or the 2-dimensional bar code recognition apparatus) are used to detect the identification of the items placed in the accommodation room, and the detection result is listed in the item list (step S200). In case, if any items cannot be recognized by the detecting apparatus, these items are sorted into a category namely "unknown items". Furthermore, the items that can be detected by various detecting apparatus such as an RFID (Radio Frequency Identification), the 2-dimensional bar code list should at least contain the names of the items. Moreover, if more precise weight estimation is required, it is preferred to record the tare weights of the items on the apparatus detected. If there is no record on the tare weights, the tare weights of the items are regarded as zero.

It should be noted that before the method for estimating dynamic quantities can be carried out, the items must be stored in the system. In other words, if no items are stored in the accommodation room, a blank item list is obtained in step S200. Furthermore, for the purpose of illustrating the present invention, the electronic identification recognition apparatus and the electronic identifications are used to respectively represent all possible detecting apparatus and the corresponding items detected in the specification. However, it should be noted these are not intended in any way to limit the scope of the present invention.

After the existing items in the accommodation room are confirmed, the system begins to detect for any changes in the total weight of all items in the accommodation room (step S210). Next, whether the quantity of the electronic identifications are increased or reduced (step S220) is determined, wherein if the quantity of the electronic identifications in the accommodation room is increased, it means new items have been placed into the accommodation room. At this time, the newly added items are appended to the item list by reading the contents of the electronic identifications, and the weights (quantities) of the items are estimated (step S230). On the other hand, if the quantity of the electronic identifications in the accommodation room is reduced, it means some items have been removed from the accommodation room. At this time, the corresponding items can be determined according to their electronic identifications and then deleted from the item list (step S240). In a case, if the total weight of the items changes but the number of electronic identification remains unchanged, it means that the newly added or removed items are from the "unknown items" category. At this time, the quantities corresponding to the items of the "unknown items" category are updated correspondingly (step S250).

According to an embodiment of the present invention, under the circumstance that different items are placed into or taken out will be further described in detail below. Generally, the items may be added or removed by placing the items one by one and removing the items one by one; and placing a plurality of items at a time and removing a plurality of items at a time.

When the items are placed into the accommodation room one by one, the change T of the total weight of all items before and after the items being currently placed into the system is obtained. Moreover, the category, name or identification code, and the tare weight $P_i$ of the items placed into the system may be obtained by reading the contents of the electronic identification thereon. Thus, the quantity $R_i$ of the item can be estimated according to the following expression, and the item list can be added or updated accordingly.

$$R_i = T - P_i$$

When two or more items are placed into the present system at the same time, only the total weight of all items in the accommodation room can be measured, and the quantity of the individual items cannot be computed. However, if the initial net weight of the items is recorded in the electronic identification, the quantity range of each item can be estimated as follows.

When k items are placed into the present system at the same time, assuming the tare weight of each item is $P_i$ ($1 \leq i \leq k$), the initial net weight of each item is $N_i$ ($1 \leq i \leq k$), and the change of the total weight after the k items are placed into the system is T, the quantity range $R_i$ (1≦i≦k) of each item can be estimated according to the following inequality:

$$\max\left(0, T - \sum_{j=1}^{k} P_j - \sum_{j=1, j\neq i}^{k} N_j\right) \le R_i \le \min\left(N_i, T - \sum_{j=1}^{k} P_j\right)$$

When one or more items are removed from k items, the quantity range of the remaining items changes dynamically. If m items (1≦m≦k) are removed from k items, assuming the serial numbers of the m items are 1st to mth and the reduced total weight is T', the quantity range $R_i$ ($m_i$+1≦i≦k) of each one of the remaining k–m items in the system can be obtained from the following inequality:

$$\max\left(0, T - T' - \sum_{j=m+1}^{k} P_j - \sum_{j=m+1, j\neq i}^{k} N_j\right) \le R_i \le \min\left(N_i, T - T' - \sum_{j=m+1}^{k} P_j\right)$$

Furthermore, if the first k–1 items are removed from the k items, i.e. only the $k_{th}$ item is left, which is a special case, the item quantity can be obtained accurately, and the quantity range needs not be estimated. That is, when m=k–1 and i=k, the above expression can be simplified as follows:

$$\max\left(0, T - T' - \sum_{j=(k-1)+1}^{k} P_j - \sum_{j=(k-1)+1, j\neq k}^{k} N_j\right) \le$$

$$R_k \le \min\left(N_i, T - T' - \sum_{j=(k-1)+1}^{k} P_j\right);$$

$$\max\left(0, T - T' - \sum_{j=k}^{k} P_j - \sum_{j=k, j\neq k}^{k} N_j\right) \le R_k \le \min\left(N_i, T - T' - \sum_{j=k}^{k} P_j\right),$$

wherein $\sum_{j=k, j\neq k}^{k} N_j = 0$ $$\max(0, T - T' - P_k) \le R_k \le \min(N_k, T - T' - P_k).$$

Wherein $T - T' - P_k \ge 0$, $N_k \ge T - T' - P_k$, so $T - T' - P_k \le R_k \le T - T' - P_k$ and $R_k = T - T' - P_k$ can be obtained.

Moreover, for the items not recognized by the electronic identification recognition apparatus (including items without electronic identifications or items whose identifications can not be recognized by the electronic identification recognition apparatus), a special category namely "unknown items" can be kept in the computing apparatus so as to ensure the consistency of the total weight of the system. When the items are placed into the system, if the total weight of the system changes as being measured by the weight or pressure measuring apparatus, and no changes occur in the electronic identification information as being sensed by the electronic identification recognition apparatus, the items are regarded as unrecognizable. These unrecognizable items are regarded as one item by the computing apparatus and are sorted into a specific category (special name or identification code, such as "unknown items"), and the total weight of this kind of item are regarded as the item quantity of one item. When one or more unrecognizable items are removed from the system, the computing apparatus updates the weight information of the item according to the changes of the total weight of the system. With this technique, errors in weight calculation caused by unrecognizable items can be avoided and items with or without electronic identifications can be taken into consideration in the system at the same time.

In order to make the present invention understandable, an example is illustrated below. Taking a smart refrigerator as an example, the refrigerator is regarded as an accommodation room; an RFID tag is taken as an electronic identification; an RFID reader serves as an electronic identification recognition apparatus; an electronic platform scale is used as a weight or pressure sensing apparatus; and an embedded system serves as a computing apparatus.

The total weight of the items and the electronic identification information, i.e. the item list, are updated by the embedded system at any given time. For example, when half bottle of milk and a piece of beef are stored in the accommodation room, the items are listed in the table below.

| Name or Identification Code | Tare Weight | Quantity |
|---|---|---|
| Milk | 20 g | 520 g |
| Beef | 50 g | 295 g |
| Total weight | | 885 g |

When the electronic platform scale detects that the total weight of the items in the accommodation room is reduced, the RFID reader is activated. If only the beef RFID tag is detected, by checking the item list, it is acquired that milk has been removed. The recorder will be deleted from the embedded system of milk from the item list. The result is shown in the table below.

| Name or Identification Code | Tare Weight | Quantity |
|---|---|---|
| Beef | 50 g | 295 g |
| Total weight | | 345 g |

When the electronic platform scale detects that the total weight of the items in the accommodation room is increased, the RFID reader is activated. If the RFID tags of milk and beef are detected respectively, by checking the item list, it can be acquired that milk is the newly added item. The total weights before and after milk is placed into the accommodation room are measured to be 345 g and 695 g respectively by the electronic platform scale, and the tare weight of milk is recorded to be 20 g in the RFID tag. According to the expression $R_i = T - P_i$, the current quantity of milk is calculated as (695 g–345g)–20 g=330 g. Accordingly, the embedded system updates the contents of the item list shown in the table below.

| Name or Identification Code | Tare Weight | Quantity |
|---|---|---|
| Milk | 20 g | 330 g |
| Beef | 50 g | 295 g |
| Total weight | | 695 g |

As shown in the table below, when three bottles of beverage with a total weight of 100 g, having no RFID tags, are placed into the smart refrigerator, the embedded system generates an "unknown items" category. The tare weight of the category is set to be 0 g, and the quantity is the total weight difference before and after the item is placed into the accommodation room.

| Name or Identification Code | Tare Weight | Quantity |
|---|---|---|
| Milk | 20 g | 330 g |
| Beef | 50 g | 295 g |
| Unknown items | 0 g | 100 g |
| Total weight | | 795 g |

As shown in the table below, when two bottles of beverage with a total weight of 80 g, having no RFID identifications, are removed from the accommodation room at the same time, the recorder of this item is named as "unrecognizable" according to the changes of the total weight of the items in the accommodation room. The tare weight is set to be 0 g, and the quantity is obtained by the current quantity minus the changes of the total weight before and after the item is placed into in the accommodation room.

| Name or Identification Code | Tare Weight | Quantity |
|---|---|---|
| Milk | 20 g | 330 g |
| Beef | 50 g | 295 g |
| Unknown items | 0 g | 20 g |
| Total weight | | 715 g |

Moreover, in order to solve the problem of placing a plurality of items at the same time, initial net weights of items should be recorded in the RFID identifications in addition to names (or identification code) and tare weights. As described above, when three kinds of items, such as cabbage, mater convolvulus and shallot, are placed into the smart refrigerator at the same time, the change in total weight is measured as 1285 g−695 g=590 g by the electronic platform scale, i.e. the total quantities and tare weights of three kinds of the items are 590 g. As shown in the table below, the total quantity of the three kinds of items can be calculated to be 550 g by subtracting the total tare weight 20 g+15 g+5 g=40 g. However, the respective quantities of the three kinds of items cannot be obtained.

| Name or Identification Code | Tare Weight | Quantity | Initial Net Weight |
|---|---|---|---|
| Milk | 20 g | 330 g | 500 g |
| Beef | 50 g | 295 g | 320 g |
| Cabbage | 20 g | 550 g | 300 g |
| Mater *convolvulus* | 15 g | | 250 g |
| Shallot | 5 g | | 120 g |
| Total weight | | 1285 g | |

At this time, the quantity ranges of the three kinds of items can be estimated from the above inequality:

$$\max(0,590-(20+15+5)-(250+120)) \leq \text{cabbage quantity} \leq \min(300,590-(20+15+5));$$

$$\max(0,180) \leq \text{cabbage quantity} \leq \min(300,550);$$

$$180 \leq \text{cabbage quantity} \leq 300.$$

From the above inequality, the cabbage quantity ranges from 180 g to 300 g.

$$\max(0,590-(20+15+5)-(300+120)) \leq \text{mater convolvulus quantity} \leq \min(250,590-(20+15+5))$$

$$\max(0,130) \leq \text{mater convolvulus quantity} \leq \min(250,550);$$

$$130 \leq \text{mater convolvulus quantity} \leq 250.$$

From the above expressions, the mater convolvulus quantity ranges from 130 g to 250 g.

$$\max(0,590-(20+15+5)-(300+250)) \leq \text{shallot quantity} \leq \min(120,590-(20+15+5));$$

$$\max(0,0) \leq \text{shallot quantity} \leq \min(120,550);$$

$$0 \leq \text{shallot quantity} \leq 120.$$

From the above expressions, the shallot quantity ranges from 0 g to 120 g.

After the estimation of the quantity range, the contents of the item list recorded by the embedded system are shown in the table below.

| Name or Identification Code | Tare Weight | Quantity | Initial Net Weight |
|---|---|---|---|
| Milk | 20 g | 330 g | 500 g |
| Beef | 50 g | 295 g | 320 g |
| Cabbage | 20 g | 180~300 g | 300 g |
| Mater *convolvulus* | 15 g | 130~250 g | 250 g |
| Shallot | 5 g | 0~120 g | 120 g |
| Total weight | | 1285 g | |

As described above, when two kinds of items are removed from the three, the quantity of the remaining item can be computed precisely. As shown in the table below, if the cabbage and mater convolvulus are removed at the same time, i.e. only shallot is left in the system, the total weight of the remaining item in the accommodation room is 775 g.

| Name or Identification Code | Tare Weight | Quantity | Initial Net Weight |
|---|---|---|---|
| Milk | 20 g | 330 g | 500 g |
| Beef | 50 g | 295 g | 320 g |
| Shallot | 5 g | Unrecognizable | 120 g |
| Total weight | | 775 g | |

According to the above expressions, quantity of the shallot is $T-T'-P_k=590-(1285-775)-5=75$ as shown in the table below.

| Name or Identification Code | Tare Weight | Quantity | Initial Net Weight |
|---|---|---|---|
| Milk | 20 g | 330 g | 500 g |
| Beef | 50 g | 295 g | 320 g |
| Shallot | 5 g | 75 g | 120 g |
| Total weight | | 775 g | |

To sum up, the dynamic quantities of variety of items can be accurately estimated by using the system and method provided in the present invention. Furthermore, when the electronic identification can provide some additional information, the possible quantity ranges can be estimated even if a plurality of items are placed into the accommodation room at the same time.

Although the present invention is disclosed with preferred embodiments as above, it is not used to limit the present invention, and any one skilled in the art can make modifications and retouches without departing from the spirit and range of the present invention. Therefore, the contents of the present invention under protection depend on the following claims.

What is claimed is:

1. A system for estimating dynamic quantities, comprising:
    an electronic identification recognition apparatus for accessing a content of an electronic identification corresponding to a item placed into the system;
    a weight measuring apparatus for measuring a total weight of all the item being carried; and
    a computing apparatus, coupled to the weight measuring apparatus and the electronic identification recognition apparatus, for receiving the total weight, such that a quantity of an individual item can be estimated and recorded by using the total weight obtained respectively before and after the individual item is stored and a recognition result obtained from the electronic identification recognition apparatus, wherein each electronic identification includes an individual identification code for each individual item.

2. The system for estimating dynamic quantities as claimed in claim 1, wherein the electronic identification contains an identification code or name, a tare weight and an initial net weight of the item being attached.

3. The system for estimating dynamic quantities as claimed in claim 2, wherein the identification code is not the same as the identification codes in other electronic identifications.

4. The system for estimating dynamic quantities as claimed in claim 1, wherein when the electronic identification recognition apparatus fails to recognize contents of the electronic identification for a corresponding item, the item is sorted into a specific category by the computing apparatus.

5. The system for estimating dynamic quantities as claimed in claim 4, wherein the electronic identification recognition apparatus fails to recognize the contents of the electronic identification for a corresponding item because the corresponding item is not provided with the electronic identification.

6. The system for estimating dynamic quantities as claimed in claim 1, wherein the weight measuring apparatus is disposed in an accommodation room.

7. The system for estimating dynamic quantities as claimed in claim 6, wherein the electronic identification recognition apparatus is also arranged in the accommodation room.

8. A method for estimating dynamic quantities, suitable for determining the quantities of items stored in a system, wherein the system has a weight measuring apparatus, the method comprising:
    detecting whether a total weight carried by the weight measuring apparatus has changed; and
    detecting whether the number of electronic identifications of the items in the system is increased or reduced when the total weight has changed,
    wherein when the number of electronic identifications is increased, the items corresponding to the newly added electronic identifications are determined as newly added items in the system and an item list is updated accordingly, and the individual weights of the newly added items is estimated;
    wherein when the electronic identifications are reduced, the items corresponding to the reduced electronic identifications are determined as items removed from the system, and the removed items are removed from the item list; and
    wherein when the number of the electronic identifications does not change, the weight of a specific category is updated.

9. The method for estimating dynamic quantities as claimed in claim 8, wherein the electronic identification records the tare weight and the initial net weight of the item being attached.

10. The method for estimating dynamic quantities as claimed in claim 9, wherein when k items are placed into the system at the same time, the step of estimating the individual weights of the newly added items includes estimating the individual weight values of the k items according to the following inequality:

$$\max\left(0, T - \sum_{j=1}^{k} P_j - \sum_{j=1, j \neq i}^{k} N_j\right) \leq R_i \leq \min\left(N_i, T - \sum_{j=1}^{k} P_j\right),$$

wherein $R_i$ is an estimated weight of the $i_{th}$ item; $P_j$ is a tare weight of the $j_{th}$ item; $N_i$ and $N_j$ are the initial net weights of the $i_{th}$ item and the $j_{th}$ item respectively; T is the difference of the total weights before and after the k items are placed into the system.

11. The method for estimating dynamic quantities as claimed in claim 10, wherein when m items are removed from the k items from the system at the same time, the individual weight values of the remaining items from the k items are estimated according to the following inequality:

$$\max\left(0, T - T' - \sum_{j=m+1}^{k} P_j - \sum_{j=m+1, j \neq i}^{k} N_j\right) \leq R_i \leq \min\left(N_i, T - T' - \sum_{j=m+1}^{k} P_j\right)$$

wherein $R_i$ is an estimated weight of the $i_{th}$ item; $P_j$ is a tare weight of the $j_{th}$ item; $N_i$ and $N_j$ are the initial net weights of the $i_{th}$ item and the $j_{th}$ item respectively; T is a difference of the total weights measured by the weight measuring apparatus before and after the k items are placed into the system; and T' is a difference of the total weights measured by the weight measuring apparatus before and after the m items are removed.

12. The method for estimating dynamic quantities as claimed in claim 9, wherein when only one item is placed into the system, the step of estimating the individual weights of the increased items includes estimating the weight of the increased item according to the following expression:

$$R_i = T - P_i$$

wherein $R_i$ is a quantity of item; T is a difference of the total weights measured by the weight measuring apparatus before and after the newly added items are placed into the system; and $P_i$ is a tare weight of the item.

13. The method for estimating dynamic quantities as claimed in claim 8, further including detecting and listing all items in the system before performing the method for estimating dynamic quantities, wherein items without recognizable electronic identifications are sorted into a specific category.

14. The method for estimating dynamic quantities as claimed in claim 8, wherein each of the electronic identifications includes an individual identifications code for each of the items.

15. A system for estimating dynamic quantities, comprising:

an electronic identification recognition apparatus for accessing a content of an electronic identification corresponding to an item placed into the system;

a weight measuring apparatus for measuring a total weight of all the item being carried; and a computing apparatus, coupled to the weight measuring apparatus and the electronic identification recognition apparatus, for receiving the total weight, such that a quantity of an individual item can be estimated and recorded by using the total weight obtained respectively before and after the individual item is stored and a recognition result obtained from the electronic identification recognition apparatus, wherein the computing apparatus determines whether the total weight carried by the weight measuring apparatus has changed; and determines whether the number of all the electronic identification of all the item in the system is increased or reduced when the total weight has changed, wherein when the number of all the electronic identification is increased, the item corresponding to a newly added electronic identification is determined as a newly added item in the system and an item list is updated accordingly, and an individual weight of the newly added item is estimated;

wherein when the number of all the electronic identification is reduced, the item corresponding to a reduced electronic identification is determined as a item removed from the system, and the removed item is removed from the item list; and wherein when the number of all the electronic identification does not change, the weight of a specific category is updated.

\* \* \* \* \*